(12) United States Patent
Gluzman et al.

(10) Patent No.: US 10,491,042 B2
(45) Date of Patent: Nov. 26, 2019

(54) WIRELESS POWER TRANSMISSION

(71) Applicant: POWERMAT TECHNOLOGIES LTD., Neve Ilan (IL)

(72) Inventors: Ilya Gluzman, Holon (IL); Elieser Mach, Rosh Tzurim (IL)

(73) Assignee: POWERMAT TECHNOLOGIES LTD., Neve Ilan (IL)

(*) Notice: Subject to any disclaimer, the term of this patent is extended or adjusted under 35 U.S.C. 154(b) by 256 days.

(21) Appl. No.: 15/145,185

(22) Filed: May 3, 2016

(65) Prior Publication Data

US 2016/0329753 A1 Nov. 10, 2016

Related U.S. Application Data

(60) Provisional application No. 62/156,279, filed on May 3, 2015.

(51) Int. Cl.
*H01F 27/42* (2006.01)
*H02J 50/12* (2016.01)
*H02J 50/50* (2016.01)

(52) U.S. Cl.
CPC .............. *H02J 50/12* (2016.02); *H02J 50/50* (2016.02)

(58) Field of Classification Search
CPC ................ H02J 7/25; H02J 5/05; H01F 38/14
See application file for complete search history.

(56) References Cited

U.S. PATENT DOCUMENTS

| | | | | |
|---|---|---|---|---|
| 2007/0021140 A1* | 1/2007 | Keyes, IV | ............... | H02J 17/00 455/522 |
| 2013/0334892 A1* | 12/2013 | Hall | ........................ | H01F 38/14 307/104 |
| 2014/0153491 A1* | 6/2014 | Lee | .......................... | H02J 17/00 370/328 |
| 2014/0252875 A1* | 9/2014 | Lee | .......................... | H02J 5/005 307/104 |

* cited by examiner

*Primary Examiner* — Sibin Chen
(74) *Attorney, Agent, or Firm* — William Dippert; Laurence Greenberg; Werner Stemer (57) ABSTRACT

A system for wireless power transmission to an electronic receiver placed in the vicinity of the system comprises a power transmitter and at least one power repeater coupled to the power transmitter. The power repeater is configured to repeat power between the power transmitter and the receiver, wherein the power repeater is tunable to a predetermined frequency, and wherein the power repeater is configured to allow operation at a frequency substantially equal to the frequency of the power transmitter.

14 Claims, 5 Drawing Sheets

WIRELESS POWER TRANSMISSION

CROSS-REFERENCE TO RELATED APPLICATIONS

This application claims the benefit of U.S. provisional application Ser. No. 62/156,279 filed May 3, 2015, the disclosure of which is hereby incorporated in its entirety by reference herein.

FIELD OF THE INVENTION

The present invention relates to wireless power transmission. More particularly, the present invention relates to an improved system and method for wireless power transmission using coupled repeaters.

BACKGROUND OF THE INVENTION

Commercially available solutions for wireless power transmission include inductive charging and also magnetic resonance techniques, that differ mainly in their operating frequency ranges while having very similar physical principals. In these solutions, an electromagnetic field is generated at a transmitting coil with a compatible receiving coil that is configured for the generated field. Thus, power can be wirelessly transferred to the receiving coil, via the electromagnetic field.

In order to increase the vertical range between the transmitting coil and the receiving coil, power repeaters are sometimes used. A power repeater is configured to operate in a predetermined frequency compatible with the transmitting coil, such that power can be wirelessly induced in the receiving coil from the repeater instead of being directly induced from the transmitting coil.

The repeater is a passive element in the circuit, with the repeater powered with induction from the transmitting coil. The magnetically induced current in the repeater creates a magnetic field of its own, such that this magnetic field of the repeater can be utilized to induce current in the receiving coil. Thus, the passive repeater(s) can be utilized to extend the active vertical range of the power transmission. However, even with such repeaters it would be advantageous to increase the lateral working range for the wireless power transmission.

SUMMARY OF THE INVENTION

According to a first aspect of the present invention, a system for wireless power transmission to an electronic receiver placed in the vicinity of the system is provided, the system comprising: a power transmitter; and at least one power repeater coupled to the power transmitter, and configured to repeat power between the power transmitter and the receiver, wherein at least one power repeater is tunable to a predetermined frequency, and wherein at least one of the at least one power repeater is configured to allow operation at a frequency substantially equal to the frequency of the power transmitter.

In some embodiments, at least one of the at least one power repeater is also configured to allow operation at a frequency distinctively different from the frequency of the power transmitter.

In some embodiments, the at least one power repeater is positioned at a distance from the power transmitter, this distance providing optimal power transmission conditions.

In some embodiments, the power transmitter further comprises a power supply configured to allow control of required power for the receiver.

In some embodiments, the power transmitter further comprises a frequency controller configured to allow changing the transmitted power frequency.

In some embodiments, the frequency is controlled to correspond with the frequency of the at least one power repeater.

In some embodiments, the frequency is controlled to correspond with changes in the impedance of the at least one power repeater.

In some embodiments, the transmitted power is controlled with change of the operating frequency.

In some embodiments, the transmitted power is controlled with amplitude modulation of the power transmitter.

In some embodiments, at least two power repeaters are coupled to the power transmitter simultaneously, and wherein the power transmitter operates at two substantially different frequencies.

According to a second aspect of the present invention, a method for wireless power transmission to an electronic receiver is provided, the method comprising: providing a power transmitter; wirelessly repeating power between the power transmitter and the receiver; and controlling the transmitted power by changing the operating frequency of the power transmitter.

In some embodiments, the transmitted power is controlled with amplitude modulation of the power transmitter.

In some embodiments, the transmitted power is further controlled in accordance with the distance between the receiver and the power transmitter.

In some embodiments, the wireless power repeating is performed by at least one power repeater, and the method further comprises positioning the at least one power repeater in a distance from the power transmitter corresponding to provide optimal power transmission conditions.

In some embodiments, the wireless power repeating is performed by at least one power repeater, and the method further comprises pre-tuning the at least one power repeater to distinctively different frequency than the frequency of the power transmitter.

In some embodiments, the method further comprises performing pinging within the frequency range of the corresponding at least one repeater to stimulate a response in the power transmitter.

In some embodiments, the response changes according to the positioning of the receiver.

In some embodiments, the operating frequency of the power transmitter is controlled to correspond with the frequency of the wireless power repeating.

In some embodiments, the control of the transmitted power corresponds to changes in the operating frequency of the power transmitter.

According to a third aspect of the present invention, a repeater assembly for wireless power transmission from an existing power transmitter to an electronic receiver placed in the vicinity of the assembly is provided, the repeater assembly comprising: at least two power repeaters coupled to the power transmitter, and configured to repeat power between the power transmitter and the receiver; and a housing configured to allow accommodation of the at least two power repeaters, wherein the at least two power repeaters operate at a distinctively different frequency than the frequency of the power transmitter.

In some embodiments, the housing is a plate with a thickness of 1 mm.

In some embodiments, the lateral area of the repeater assembly is substantially larger than the lateral area of the power transmitter.

In some embodiments, at least two power repeaters are coupled to the power transmitter simultaneously, and wherein the power transmitter operates at two substantially different frequencies.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the specification, including definitions, will control. In addition, the materials, methods, and examples are illustrative only and not intended to be limiting.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Before explaining at least one embodiment in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For clarity, non-essential elements were omitted from some of the drawings.

Figure 1:
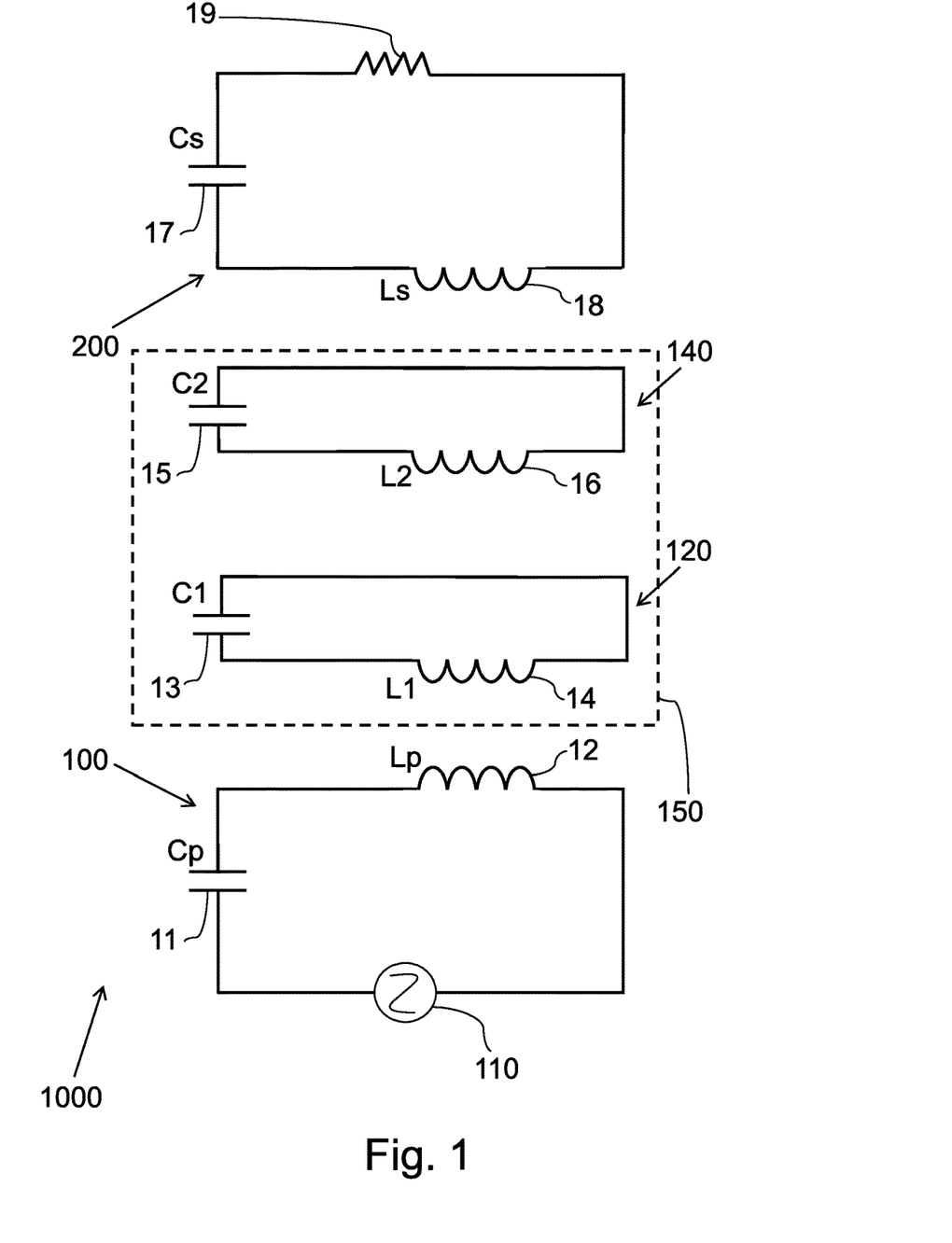
FIG. 1 schematically illustrates a circuitry for a wireless power transmission system, according to an exemplary embodiment.

FIG. 1 schematically illustrates a circuitry for a wireless power transmission system 1000, with a repeater assembly 150. A primary resonant tank circuit 100 has a primary capacitance Cp 11 and a primary inductance Lp 12. If a power source 110 is provided to the primary resonant circuit 100, then a desirable electromagnetic field may be created in order to induce magnetic flux through auxiliary coils in the vicinity of the primary transmitting resonant circuit 100. By positioning the repeater assembly 150 near the electromagnetic field created by the transmitting resonant circuit 100, the primary circuit 100 may be coupled to a first repeater 120, and also to a second repeater 140. It should be noted that in an exemplary embodiment, for simplicity the repeater assembly 150 comprises two passive repeaters, while additional repeaters may also couple to the primary circuit 100. Preferably, the repeater assembly 150 has an area larger than the primary circuit 100 and comprises four passive repeaters.

In a preferred embodiment, at least two passive repeaters are provided as adjacent coils embedded in a thin plate, with plate thickness of about 1 mm (for instance as shown in FIG. 5). Such a plate may be simply placed over the transmitting primary circuit in order to increase the lateral range of the primary circuit through the passive repeaters, further described hereinafter.

The first repeater 120 has a first capacitance C1 13 and a first inductance L1 14. Similarly, the second repeater 140 has a second capacitance C2 15 and a second inductance L2 16, wherein the capacitance and/or inductance of the first and second repeaters 120, 140 may be configured to allow optimal power transmission. Each repeater is magnetically coupled to the primary transmitting resonant circuit 100 with some coupling coefficient 0<k<1 (whereby each repeater has its own coupling coefficient). The coupling coefficient "k" represents the degree of inductive coupling between a transmission coil and a reception coil, wherein the coupling coefficient "k" may be varied according to the relative position and distance between the transmission coil and the reception coil (for instance a repeater). In some cases, working with two coupling coefficients (e.g. from transmitter to repeater, and from repeater to receiver) may provide higher efficiency when compared to working without repeaters with similar distances.

Additional coils (for instance a wireless power receiver coil, possibly embedded in a rechargeable electronic device such as a smartphone) may then couple to the first repeater 120 and/or the second repeater 140 and thus inductively receive power to be charged or powered. Optionally, the second repeater 140 is in turn induced from the first repeater 120 (thus increasing the distance from the second repeater to the primary coil), such that any additional coil may be induced in a greater distance from the transmitting coil.

An exemplary second coil 200 has a secondary capacitance Cs 17, a secondary inductance Ls 18, and also a load 19. It is appreciated that by predetermining all of these parameters Cp, Lp, C1, L1, C2, L2. Cs, Ls, the power transmission may be controlled when the transmitter, receiver, and repeaters are placed at suitable distances such that corresponding coupling coefficients may allow the required power transmission.

It should be noted that with repeater setting, the auxiliary coil 200 need not be connected to any power supply since power is drawn by the inductors (i.e. first and/or second repeater 120, 140) from the primary circuit 100 alone.

Figure 2A:
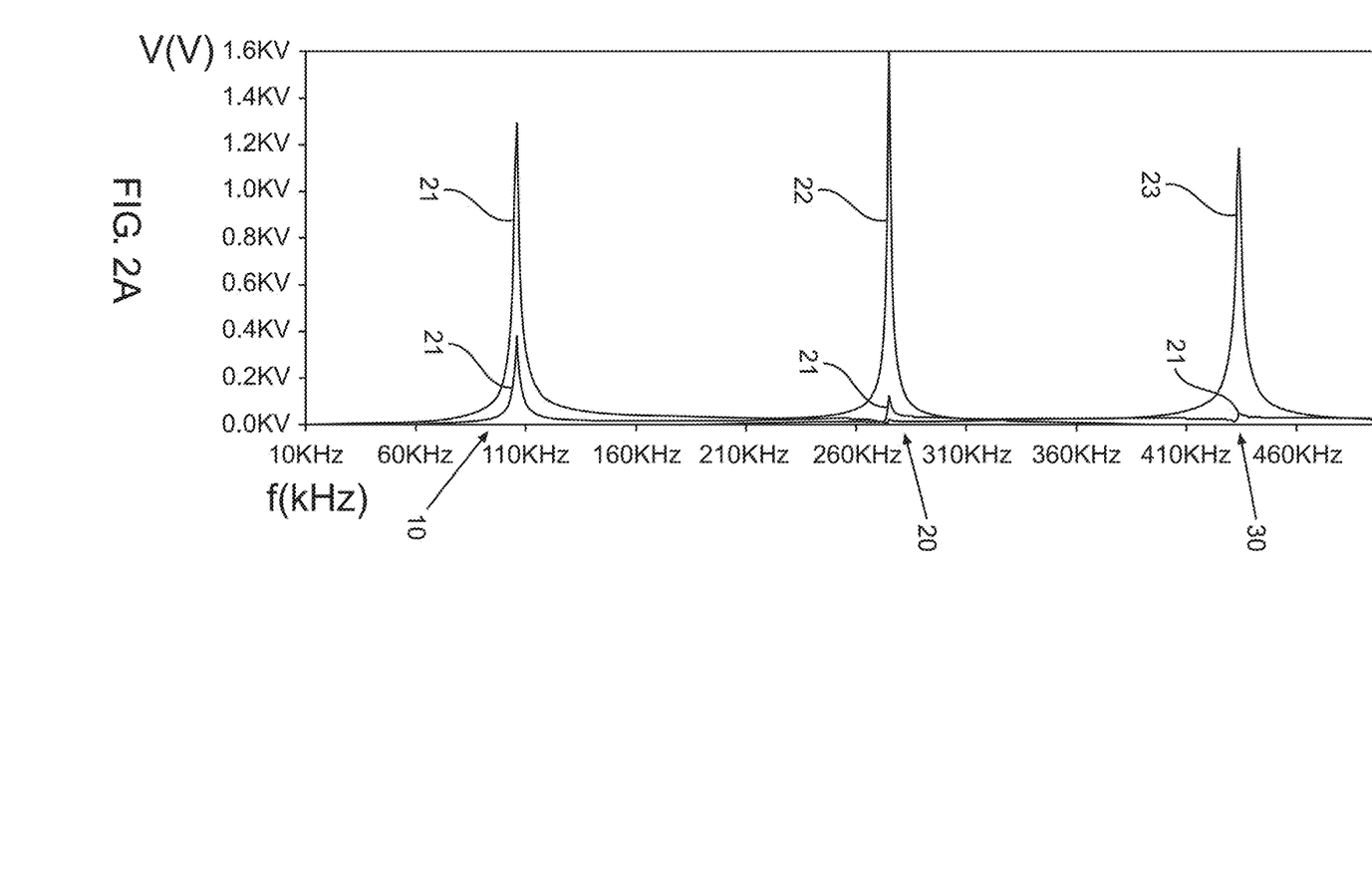
FIG. 2A shows a voltage vs. frequency graph of a primary coil coupled to first and second repeaters, according to an exemplary embodiment.

FIG. 2A shows a simulation of a voltage vs. frequency graph of a primary circuit 100 coupled to first and second repeaters 120, 140. A first curve 21 corresponds to the primary transmitting coil 100. A second curve 22 corresponds to the first repeater 120, and a third curve 23 corresponds to the second repeater 140.

Generally, these curves (of a single transmitter and two repeaters) have three peaks 10, 20, 30. A first peak (~110 kHz) corresponds to the resonance frequency of the primary circuit 100. A second peak (~270 kHz) corresponds to the coupling of the primary circuit 100 to the first repeater 120. A third peak (~430 kHz) corresponds to the coupling of the primary circuit 100 to the second repeater 140. It should be noted that these curves do not show the induced self-resonance of additional receivers.

Figure 2B:
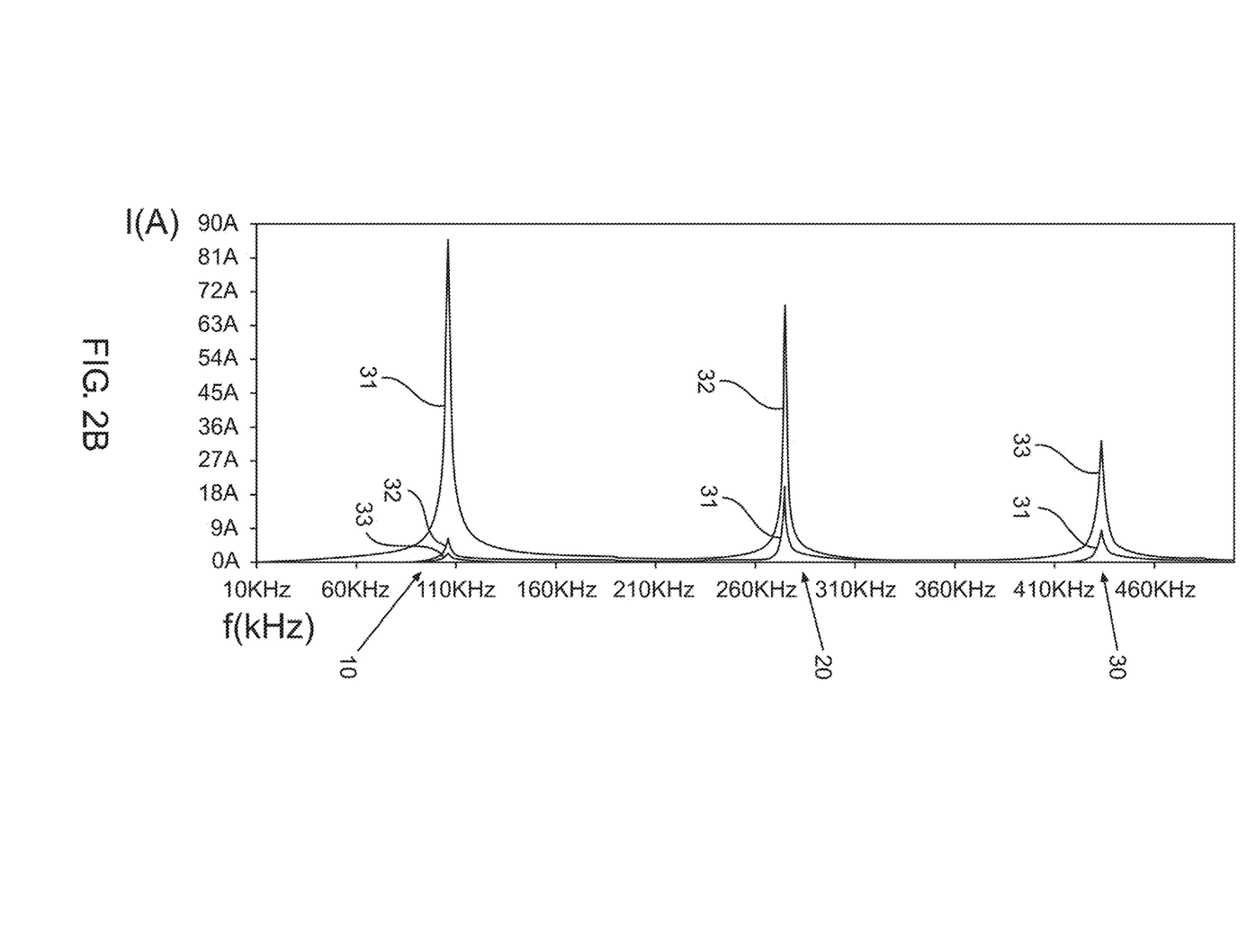
FIG. 2B shows a current vs. frequency graph of the primary coil coupled to the first and second repeaters, according to an exemplary embodiment.

At the first peak 10, the first curve 21 is dominant At the second peak 20, the second curve 22 is dominant At the third peak 30, the third curve 23 is dominant FIG. 2B shows a simulation of a current vs. frequency graph of a primary circuit 100 coupled to first and second repeaters 120, 140. Similarly to the voltage graph shown in FIG. 2A, here the current graph has a first curve 31 corresponding to the primary transmitting circuit 100. A second curve 32 corresponds to the first repeater 120, and a third curve 33 corresponds to the second repeater 140.

These curves also have three peaks 10, 20, 30. At the first peak 10, the first curve 21 is dominant At the second peak 20, the second curve 22 is dominant At the third peak 30, the third curve 23 is dominant It should be noted that the abovementioned values in the graphs (shown in FIGS. 2A-2B), are exemplary and correspond to a particular simulation. However, the same operation may be achieved with this system having different values. For example, changing the capacitance of the primary circuit such that the resonant tank may operate in a different frequency. Therefore, similar behavior of these curves (of a single transmitter and two repeaters) may be achieved for different wireless power transmission techniques, such as the inductive charging and also magnetic resonance techniques.

It is appreciated that working with frequencies below the ~7 Mhz resonance frequency, prevents the abovementioned system from interacting with household metals (e.g. coins in the pocket of a user) that may interfere with the operation of the system.

A frequency controller (not shown in the figures) may be coupled with the primary transmitting circuit 100 in order to utilize the coupling to the repeaters (as may be appreciated from FIGS. 2A-2B). The first and second repeaters 120, 140 may then be pre-tuned to distinctively different frequencies than the resonance frequency of the primary circuit 100. Preferably, the primary circuit 100 resonates at a significantly lower frequency than the predetermined resonance frequency of the repeaters 120, 140. Optionally, the resonance frequencies of the system may be determined by adjusting the capacitance and/or inductance of the different components in the system.

In such a configuration, the passive repeaters 120, 140 are driven by the "tail" of the resonance curve of the primary coil 100. Namely, due to the coupling of the primary circuit 100 to the repeaters 120, 140, two peaks are created as a "tail" for the frequencies of the repeaters (see peaks 20, 30 in FIGS. 2A-2B).

In case that the first and second repeaters 120, 140 are configured to have a high quality factor (as shown in FIGS. 2A-2B) and also a compatible coupling coefficient, then the repeaters 120, 140 may drive sufficient energy in order to support charging through them by auxiliary coils, due to the coupling with the primary coil, wherein the frequency may be controlled with the frequency controller. It is appreciated that while the simulation (shown in FIGS. 2A-2B) describes a repeater assembly with two repeaters, a similar simulation may easily be performed for additional repeaters. For example, a repeater assembly with four repeaters.

In order to control the power transmitted through a repeater to a receiver, the impedance of the repeaters may be used. Initially, the impedance of the repeater may be used in order to detect possible placement of a receiver in the vicinity of the repeater. This may be performed with "analog pings" in some frequency within the frequency range of the corresponding peak of the repeater (for instance the peak 30 of the second repeater, as shown in FIGS. 2A-2B). Such analog pinging may stimulate a response in the transmitting circuit, whereby the response changes according to the placement of the receiver. This change occurs due to changes in the impedance of the repeater. Optionally, the inductance of the repeater may also change accordingly.

Furthermore, the transmitted power may also be controlled by varying the operating frequency (within the frequency range of the repeater's resonant peak). Operating at a frequency higher and/or lower than the resonant frequency of the repeater may decrease the transmitted power and vice versa. Preferably, the operating frequency is above resonance. The control of the transmitted power may also be done in other ways (for instance amplitude modulation, duty cycle modulation, changing the characteristics of the receiver, etc.).

Thus, since a repeater coupled to a receiver may have distinguishable impedance, then such a repeater may be recognized by the primary circuit. Once a particular repeater is recognized, the primary circuit may begin transmitting in the frequency domain of that particular repeater (using the frequency controller). This is in contrast to commercially available solutions, where all coils and repeaters have substantially equal frequencies as they only aim at increasing the vertical distance.

The induced magnetic flux generated at the repeater may be sufficient for the additional coil 200 and therefore provide enhanced lateral range of operation since there's no longer the limitation of the primary coil and repeaters operating in a single frequency at a short distance. Specifically, instead of being forced to place a device with the additional coil (e.g. a Bluetooth earpiece) precisely at the central point of the primary coil, it is now possible to place a repeater assembly over the primary coil such that the lateral range for positioning the additional coil increases due to the extended range provided by the repeater assembly. For example, increasing from a 7 cm lateral range with the primary coil to a 13 cm range with the repeater assembly. Optionally, in addition to an increase in the lateral range, the vertical range for wireless power transmission also increases.

Furthermore, it may be possible to use existing infrastructure (e.g. charging spots at coffee shops) with additional passive repeaters such that the entire range is extended, whereby only minor adjustments may be required. For example, placing a repeater assembly over a table having an existing built-in charging spot.

It is appreciated that the abovementioned graphs (shown in FIGS. 2A-2B), are shown for one configuration of the wireless power transmission system 1000, specifically for the inductive coupling configuration operating in lower frequencies (<1 MHz). With appropriate adjustments to the system 1000, similar behavior may be achieved for the magnetic resonance configuration operating in higher frequencies (~7 MHz).

In a further embodiment, a different number of repeaters are used in the system. Using the same principle, additional repeaters may further increase the operational range of the power transmission. Optionally, only a single repeater may be used.

Figure 3:
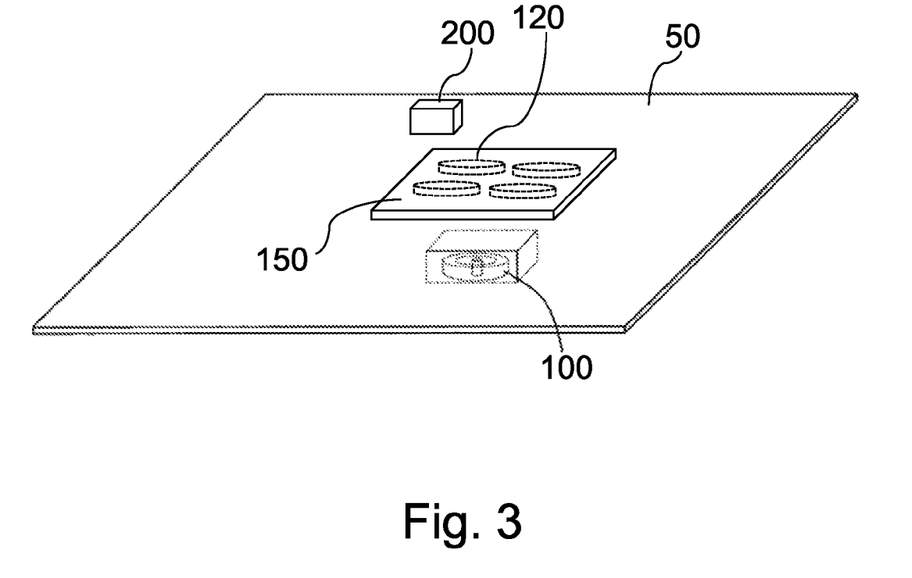
FIG. 3 schematically illustrates a repeater assembly positioned over an existing infrastructure with a primary coil, according to an exemplary embodiment.

FIG. 3 schematically illustrates a repeater assembly 150 positioned over an existing infrastructure with a primary coil 100 (e.g. built-in in a table 50). With commercially available solutions, if the repeater assembly 150 was not present, then the auxiliary coil 200 is forced to be positioned directly over the primary coil 100 in order to receive wireless power transmission due to the limited range of the electromagnetic field. However, by simply placing the repeater assembly 150 (for instance comprising four passive repeaters) over the primary coil 100 then the range for induction increases and it is now possible to position the auxiliary coil 200 near a repeater and not necessarily over the primary coil 100.

If the repeater assembly 150 is placed over the primary coil 100, then a user interested in wirelessly powering a device with a compatible auxiliary coil 200 may move the auxiliary coil 200 to be near the repeater assembly 150. In a preferred embodiment, the system identifies which repeater in the repeater assembly 150 is closest to the auxiliary coil 200 and the frequency of the primary coil 100 may then be adjusted by the frequency controller (not shown) to couple with the nearest repeater (e.g. the second repeater 120). For example, the primary coil 100 may start operating in a frequency slightly higher than the frequency of the second repeater 120 that is nearest to the auxiliary coil 200 such that the auxiliary coil 200 may receive power from the repeater instead of receiving power directly from the primary coil 100.

In a further embodiment, the system may comprise active repeaters that can change the operating frequency to the same frequency domain by themselves, instead of the primary coil changing the frequency. Thus, a receiver with large or multiple "pick-up" coils in the same frequency domain may use a superposition of more than one repeater. Optionally, such active repeaters may operate in the same frequency domain but are also used simultaneously from a lateral point of view, therefore providing simultaneous transmission.

In a further embodiment, in order to cover a large area multiple such systems may be utilized, wherein each system has a primary coil and a repeater assembly. Thus, a user may place an auxiliary coil such that at least one primary coil may transfer power to it. For example, a long table with multiple primary coils, whereby each primary coil is equipped with a repeater assembly.

In a further embodiment, the system may be provided as a single unit with the primary coil in the centre and multiple passive repeaters surrounding the primary coil. Alternatively, the system may be provided as a single unit with the repeater assembly fixed adjacent to the primary coil, instead of providing a plate (with repeaters) that needs to be positioned over the primary coil.

In a further embodiment, the primary coil may operate in at least two different frequencies simultaneously, for instance a high frequency (~7 MHz) and a low frequency (~1 MHz). Thus, it may be possible to induce more than one repeater at the same time. This may be required to power an auxiliary coil with multiple repeaters, and/or to power multiple auxiliary coils with multiple repeaters. For example, powering a first auxiliary coil with a first repeater and powering a second auxiliary coil with a second repeater operating at a different frequency.

In a further embodiment, using multiple tuneable repeaters, several devices may be detected near the repeater assembly. Then at least one repeater may be tuned to a frequency substantially equal to the frequency of the power transmitter thereby extending the range of the power transmission, whereby the other repeaters may operate off resonance. Thus, the repeaters which are tuned to the relevant frequency (i.e. of the frequency of the transmitter) may resonate and power all of the detected devices while the other repeaters may remain "silent" (as they operate off resonance). Optionally, in this configuration each repeater powers a single device. It is appreciated that such a feature may prevent the heating of household metallic objects placed on the same surface, since the repeaters not coupled to the detected device are "silent" and therefore do not transmit. This can be specifically important in a restaurant (or coffee-shop) environment where metallic objects (e.g. forks, etc.) are likely to be placed in the vicinity of the repeater assembly, for example as a plate on the table.

Figure 4:
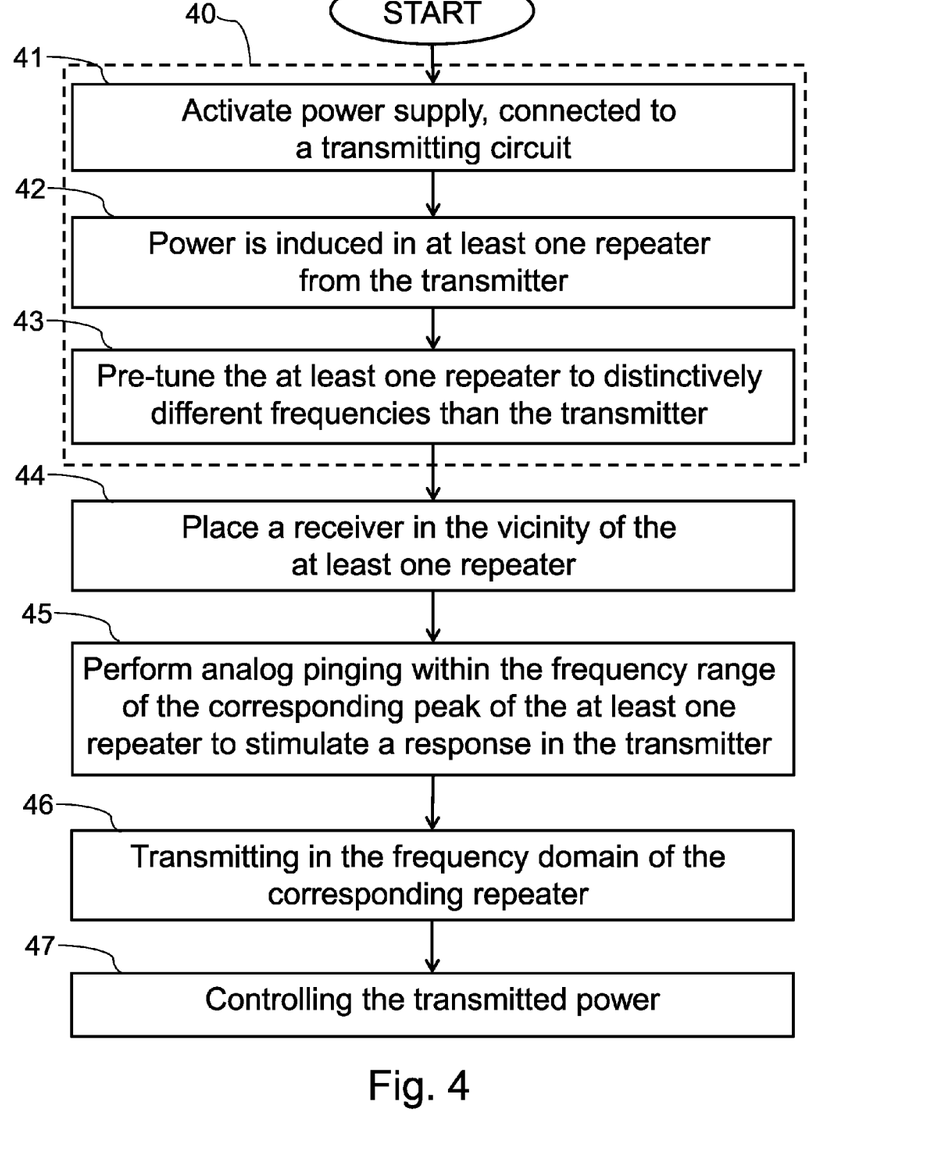
FIG. 4 shows a flow chart for controlling the power transmitted from the transmitter to the receiver, according to an exemplary embodiment.

FIG. 4 shows a flow chart for controlling the power transmitted from the transmitter to the receiver. In a system with a transmitter and at least one repeater, initially the power supply is activated 41. Then power may be induced in the at least one repeater from the transmitter 42 Finally, the system may be ready for power transmission 40, whereby the at least one repeater may be pre-tuned to a distinctively different frequency than the resonant frequency of the transmitter 43.

Next, a receiver may be placed in the vicinity of the at least one repeater 44. If analog pinging is performed within the frequency range of the corresponding peak of the at least one repeater, then a response is stimulated in the transmitter 45 (for the corresponding repeater). Once the corresponding repeater is detected, the transmitter may transmit in the frequency domain of the corresponding repeater 46 Finally, the transmitted power corresponding to the receiver may be controlled 47.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A system for wireless power transmission to an electronic receiver placed in the vicinity of the system, the system comprising:
   a power transmitter having a resonance frequency; and
   at least one power repeater tuned to a resonance frequency substantially different than the resonance frequency of the power transmitter,
   wherein the at least one power repeater is coupled to the power transmitter and is configured to repeat power from the power transmitter to the power receiver, and
   wherein an operating frequency of the power transmitter is slightly higher than the resonance frequency of the repeater.

2. The system of claim 1, wherein the system comprises a plurality of power repeaters, and wherein each power repeater is tuned to a different resonance frequency.

3. The system of claim 2, wherein each power repeater is positioned at a distance from the power transmitter, wherein the distance provides optimal power transmission conditions.

4. The system of claim 2, wherein the power transmitter further comprises a power supply configured to allow control of required power for the power receiver.

5. The system of claim 4, wherein the power transmitter further comprises a frequency controller configured to change the operating frequency.

6. The system of claim 5, wherein the operating frequency is controlled to be slightly higher than the different resonance frequency of any power repeater of the plurality of power repeaters.

7. The system of claim 5, wherein the power being transmitted is controlled with amplitude modulation of the power transmitter.

8. The system of claim 5, wherein at least two power repeaters are each coupled to the power transmitter simultaneously at substantially different frequencies.

9. A method for wireless power transmission to an electronic receiver, the method comprising:
providing a power transmitter;
wirelessly repeating power between the power transmitter and the electronic receiver; and
controlling the power being transmitted by changing the operating frequency of the power transmitter,
wherein the wirelessly repeating power is performed by at least one power repeater, and wherein the operating frequency of the power transmitter is tuned to be distinctively different from a pre-tuned resonance frequency of the at least one power repeater.

10. The method of claim 9, further comprising performing pinging within a frequency range of the corresponding at least one repeater to stimulate a response in the power transmitter.

11. The method of claim 10, wherein the response changes according to a position of the electronic receiver.

12. A repeater assembly for wireless power transmission from an existing power transmitter to an electronic receiver placed in the vicinity of the assembly, the repeater assembly comprising:
at least two power repeaters coupled to the power transmitter, and configured to repeat power between the power transmitter and the electronic receiver; and
a housing configured to allow accommodation of the at least two power repeaters, wherein the at least two power repeaters operate at a frequency distinctively different from a frequency of the power transmitter.

13. The repeater assembly of claim 12, wherein a lateral area of the repeater assembly is substantially larger than a lateral area of the power transmitter.

14. The repeater assembly of claim 12, wherein the at least two power repeaters are coupled to the power transmitter simultaneously, and wherein the power transmitter operates at two substantially different frequencies.

* * * * *